United States Patent [19]

Ichimura

[11] Patent Number: 4,825,253

[45] Date of Patent: Apr. 25, 1989

[54] FLASH ILLUMINATION APPARATUS

[76] Inventor: Hajime Ichimura, Purinsu Vira 201, 3-28-19, Minamisenzoku, Ota-ku, Tokyo 145, Japan

[21] Appl. No.: 97,517

[22] PCT Filed: Jan. 8, 1987

[86] PCT No.: PCT/JP87/00011

§ 371 Date: Nov. 9, 1987

§ 102(e) Date: Nov. 9, 1987

[87] PCT Pub. No.: WO87/04267

PCT Pub. Date: Jul. 16, 1987

[30] Foreign Application Priority Data

Jan. 14, 1986 [JP] Japan .................................. 61-4226

[51] Int. Cl.$^4$ ............................................ G03B 27/72
[52] U.S. Cl. .................................................... 355/71
[58] Field of Search ........................ 355/37, 67, 71, 70; 354/126; 356/23; 362/16

[56] References Cited

FOREIGN PATENT DOCUMENTS 46266 3/1982 Japan .
177532 10/1984 Japan .
225136 11/1985 Japan .

Primary Examiner—Richard A. Wintercorn
Attorney, Agent, or Firm—David R. Thornton

[57] ABSTRACT

A flash illumination apparatus in which an original is simultaneously illuminated over the whole surface thereof by means of a single or plurality of flash lamps, wherein light reflected by the original is focused onto a light sensitive material for exposure thereof, characterized in that a collecting and diffusing optical element is disposed immediately before the flash lamp within a range of luminous flux so that the luminous flux illuminates a particular range of the original thereby improving the uniformity in illumination on the original.

2 Claims, 2 Drawing Sheets

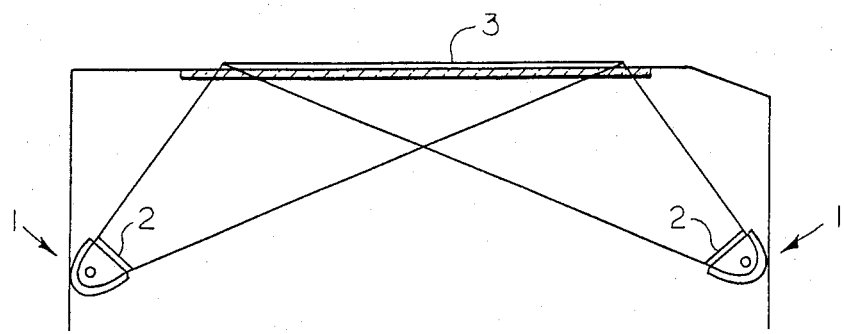
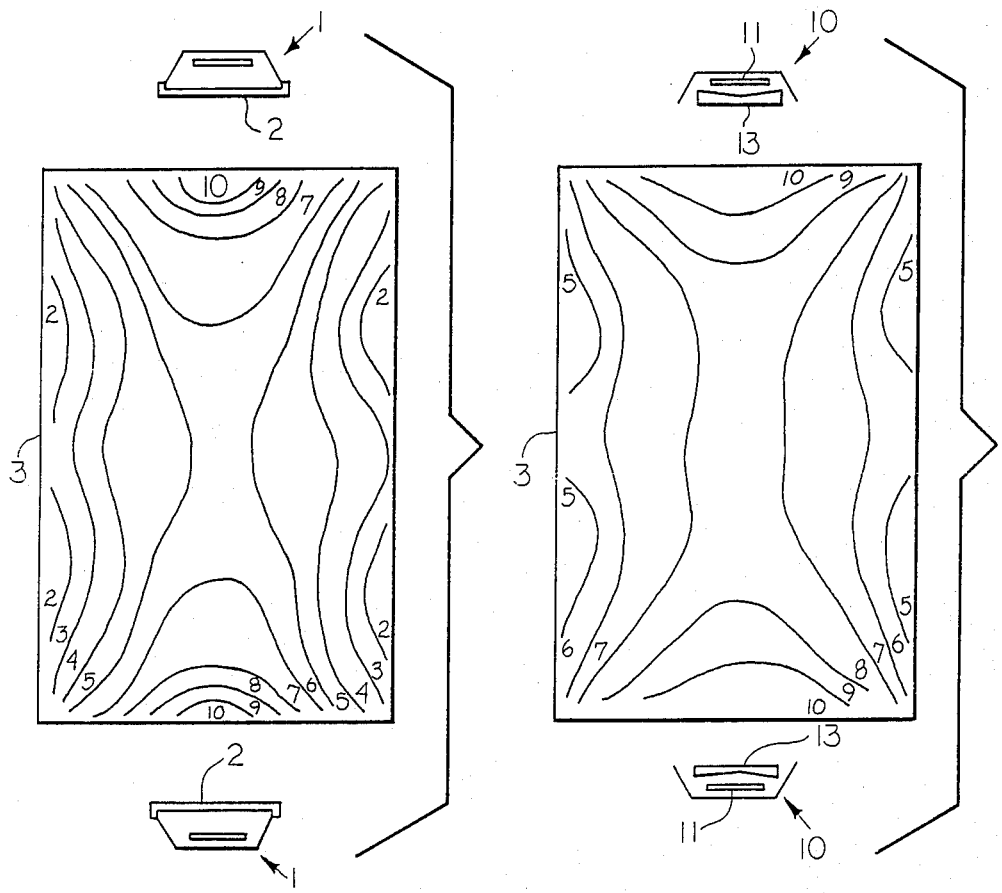
FIG. 2
PRIOR ART
FIG. 3
PRIOR ART
FIG. 4

FLASH ILLUMINATION APPARATUS

TECHNICAL FIELD

The present invention relates to a flash illumination apparatus for a copying machine and the like in which an original is illuminated simultaneously over the whole surface thereof by a single or a plurality of flash lamps, wherein light reflected from the original is focused onto a light sensitive material through an optical system for thereby carrying out exposure

BACKGROUND ART

A so-called strobe flash illumination apparatus employing a xenon discharge tube is utilized in various fields as a convenient light source of high efficiency. When used as the original illuminating apparatus in a copying machine, the above-mentioned apparatus is advantageous in respects to low heat generation, excellent color rendering properties and others, assuring a high utility. However, in the case of the copying machine in which an original is simultaneously illuminated over the whole surface thereof, it is necessary to illuminate uniformly the original as a whole. Since such uniform illumination cannot be accomplished solely with the flash lamp by itself, it has heretofore been practiced to make use of a reflector or the like. By using the reflector, a greater proportion of light rays emitted from the lamp can be caused to reach the surface of the original, whereby the utilization efficiency of light energy can be enhanced. However, with regards to the uniform information over the whole surface of the original, this arrangement was inadequate.

When used as strobe flash in the photographing, such a structure is generally adopted in which a collecting and diffusing optical element (stepped concave or convex lens such as a Fresnel lens) is provided on the front side of the reflector. In the case of this structure, the light rays emitted directly from the lamp as well as those reflected by the reflector equally undergo diffusing action. Thus, this structure is dissatisfactory as the means for realizing uniform illumination even though it can change the range within which light rays can reach, because the light rays directly emitted by the lamp and those reflected by the reflector are equally collected and diffused.

FIG. 3 is a view showing an example of illuminance distribution over an original surface obtained by illuminating the original surface from below with inclination by means of lamp units 1 each having a collecting and diffusing optical element 2 and disposed below the original 3 at both sides thereof. Curves shown in the figure represent equi-illuminance curves, wherein numerals inserted between the curves indicate the relative values of illuminance in the associated areas on the assumption that illuminance in the vicinity of the lamp 1 is given by 10. It will be seen that illuminance is decreased to 2 at both side ends in FIG. 2.

In view of the aforementioned drawbacks of the hitherto known original illuminating apparatus employing the flash lamps for use in the copying machine and others, it is an object of the present invention to provide a flash illumination apparatus for use in the copying machines and others which is capable of uniformizing to an acceptable extent the illuminance distribution on an original surface illuminated with flash lamps.

DISCLOSURE OF THE INVENTION

For accomplishing the object mentioned above, the flash illumination lamp according to the present invention is characterized in that a luminous flux collecting and diffusing optical element is disposed immediately before said flash lamp within a range of luminous flux emitted by said lamp and illuminating directly the surface of said original for collecting and diffusing said luminous flux so that said luminous flux illuminate a particular range of the original.

BRIEF EXPLANATION OF THE DRAWINGS

FIG. 3 is a view showing distribution of illuminance on a original illuminated by the same, and FIG. 4 is a view showing an example of distribution of on an original illuminated with the illuminating apparatus according to the present invention.

BEST MODE FOR CARRYING OUT THE INVENTION

Figure 1A:
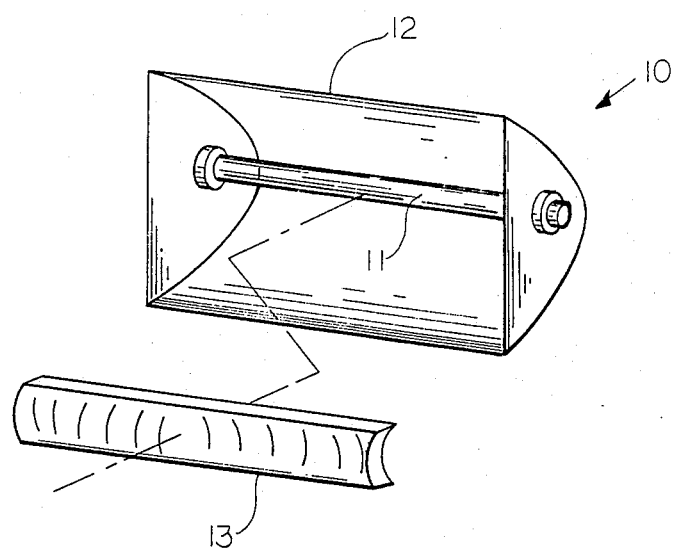
FIGS. 1(A) and 1(B) are, respectively, an exploded perspective view and a sectional view showing an embodiment of the present invention, FIG. 2 a hitherto known original illuminating apparatus.
Figure 1B:
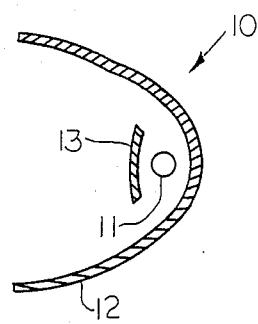

In the following, an exemplary embodiment of the present invention will be described in detail by referring to the drawings.

Referring to FIGS. 1(a) and (b) showing an embodiment of the present invention, a flash lamp unit 10 is composed of a flash lamp 11, a reflector 12 opened at the side facing an object to be illuminated, and a collecting and diffusing optical element 13 disposed immediately in front of the flash lamp. The collecting and diffusing optical element 13 may be constituted by a concave lens or a stepped concave lens or convex lens or stepped convex lens and is so disposed in the range of the luminous flux emitted from the lamp 11 and illuminating directly the original surface that the diffused luminous flux illuminates a particular range of an original surface. The particular range is so established that the portion which is illuminated with low illuminance only with the light rays reflected by the reflector 12 can be additionally and correctively illuminated with the light rays collected and diffused by the collecting and diffusing optical element at high luminance.

With the arrangement of the apparatus described above, the light rays reflected by the reflector 12 do not pass through the collecting and diffusing optical element 13 but reach directly the original surface, whereby design of the reflector is facilitated because there is no need for taking into consideration the variation in the optical path due to the collecting and diffusing lens. Further, due to the action of the collecting and diffusing optical element 13, only the portion on the original surface which would be illuminated with low illuminance with only the light rays reflected by the reflector can be illuminated directly by light emitted from the lamp 11, whereby uniform illumination can be accomplished with improved efficiency.

FIG. 4 is a view showing an example of illuminance distribution on an original surface obtained in the case where the flash illumination apparatus 10 according to the present invention is mounted in place of the lamp unit shown in FIG. 2 for illumination of the original surface. When compared with the illuminance distribution realized through illumination by the hitherto known apparatus shown in FIG. 3, it will be seen that the quantity of light is increased in the center portion and both lateral side portions of the original 3, falling within an allowable range of illuminance, whereby substantially uniform distribution of illuminance is realized as a whole.

INDUSTRIAL APPLICABILITY

As will be seen from the foregoing, it is possible according to the invention to uniformize the distribution of illuminance on a surface of an original with a simple structure in which a collecting and diffusing optical element is provided immediately before a flash lamp within a range of luminous flux directly emitted by the flash lamp. By using this flash illumination lamp in a copying machine of a type in which the original is illuminated over the whole surface and apparatus for preparing diapositives for projectors, copies or diapositives for projection can be obtained which have image density distributions duplicating the original with high fidelity.

I claim:

1. A flash illuminating apparatus for illuminating a given area with improved uniformity, comprising:
   a strobe flash tube;
   a reflector extending around said flash tube and terminating in an open face for reflecting illumination directed either laterally or rearwardly with respect to said open face from said flash tube through said open face of said reflector and for dispersing the reflected illumination over said given area; and
   a dispersing element mounted within said reflector in intercepting relation to a majority of the illumination directed forwardly from said flash tube and not in intercepting relationship to a majority of said reflected illumination so as to independently disperse the forwardly directed illumination over said given area whereby both said forwardly directed illumination and said reflected illumination are independently dispersed over said given area to thereby increase the uniformity of the illumination of said given area.

2. The apparatus of claim 1 wherein said forwardly directed illumination from said flash tube is essentially confined within an angle defined by said flash tube and the edges of said open face of said reflector, and said dispersing element is mounted between said open face and said flash tube in intercepting relation to the illumination within said angle and extends approximately to the limits of said angle so as to essentially only intercept said forwardly directed illumination from said flash tube.

* * * * *